Figure 1:
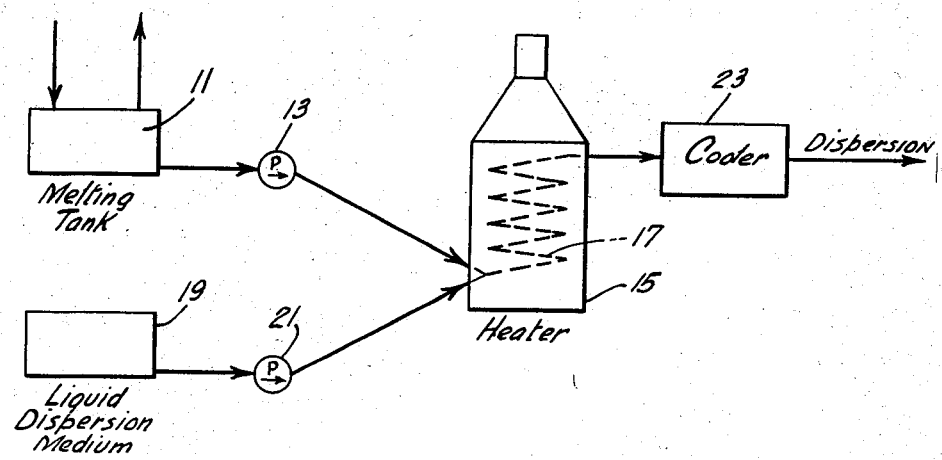

July 22, 1958  L. T. WORK  2,844,541
PRODUCTION OF DISPERSIONS
Filed Sept. 9, 1955

United States Patent Office 2,844,541
Patented July 22, 1958

2,844,541

PRODUCTION OF DISPERSIONS

Lincoln Thomas Work, Maplewood, N. J., assignor to Texaco Development Corporation, New York, N. Y., a corporation of Delaware Application September 9, 1955, Serial No. 533,328

13 Claims. (Cl. 252—314)

The present invention relates to a novel method for producing dispersions of various dispersoids in dispersing media. The method is applicable to the production of emulsions of one liquid in another, and of suspensions of a solid material in a liquid or semi liquid. For example, dispersions can be formed of sodium, sulfur, paraffin wax, and asphalt in various liquid dispersion media such as hydrocarbons, water and the like.

Many methods of producing colloidal materials have previously been used, such as, for example, the production of colloidal metals by means of an electric discharge, the precipitation of colloidal material by drowning a solution in a non-solvent, the precipitation of finely divided substances by chemical action and the reduction of particle size by mechanical grinding either in the presence or absence of other solid or liquid material.

The production of emulsions of oils or low melting waxes in water may be accomplished by mechanical means, such as, for example, shaking or agitating with a mechanical stirrer, but in general, the method has been limited to those materials which are liquid, or which can easily be brought into a liquid condition. Furthermore, the various mechanical means for the production of emulsions and suspensions are generally attended by certain disadvantages, such as, for example, operation on a batch scale rather than continuously and the necessity for the use of power for operating the mechanical agitating means, which adds to the cost of operation. In many cases, moreover, rapid agitation by mechanical methods gives rise to excessive foaming.

My improved method for producing a dispersion of a first substance in a liquid dispersion medium comprises simultaneously passing the first substance and the liquid together in a stream through a heating zone, which may comprise a long tubular pipe arranged within a furnace. The mixture is heated sufficiently to vaporize part or all of the liquid dispersion medium to form vapor while maintaining the first substance unvaporized. The temperature should be sufficient to melt the first substance if it is a solid or semi solid. Then the mixture and vapor are subjected to high velocity and turbulent flow to break up the first substance to liquid particles of extremely fine size.

Dispersion of the fine liquid particles in the dispersion medium is expedited by employing only partial vaporization of the dispersion medium, because the fine liquid particles produced during the operation constantly enter into the unvaporized dispersion medium and are dispersed therein.

When the first substance is one which reacts readily with some atmospheres it is essential to exclude them during the operation. For example both air and water vapor must be excluded from contact with sodium.

The effluent of mixture and vapor is then cooled to condense the vapor and solidify any melted particles, thereby forming a dispersion of extremely fine particles of the first substance in the liquid dispersion medium. Cooling may be accomplished by circulating a cooling fluid in indirect heat exchange relationship with the effluent, or by injecting cool liquid, such as additional dispersion medium, directly into the effluent for dilution and cooling thereof.

The method described is operable over a wide range of proportions of dispersion medium and dispersoid. For example, the amount of dispersoid can range from as little as 5% of the mixture by weight to as much as 65%.

The heating zone may be within a pipe having dimensions based upon the desired capacity of a plant. Diameters may range from ½ to 2 inches for example, and lengths may be as little as 100 and as much as 1000 feet, more or less.

The invention is generally applicable to the treatment of any substances which are suited for the production of colloidal suspensions or emulsions. The dispersion medium may be any liquid which will not dissolve the dispersoid to any appreciable extent. The invention is particularly advantageous in the treatment of soft materials, as for example sodium and sulfur, which are extremely hard to grind in the solid state. As further and very desirable specific applications of the invention may be mentioned the production of colloidal water dispersions of lubricating oils, petrolatum, and paraffin wax, emulsions and suspensions of various mercury compounds or copper compounds in oil, sulfur and sodium in oil, sulfur in water, and many other combinations to be used as fungicides, insecticides, preservatives, delustrants, pigments, and chemical reactants.

The dispersion may be effected in the presence of a protective material. In general, by the expression "protective material" is meant any dispersing agent, wetting agent or protective colloid. As specific examples of such compositions may be mentioned glyptal resins, gum tragacanth, alkali metal salts of the higher fatty acids, gall acids and their derivatives, agar-agar, glue, methyl cellulose, sulfite cellulose lyes, sodium cellulose phthalate, calcium saccharate, sodium cellulose glycollate, gelatin, derivatives of cholesterine, phosphatides, gelloses, natural and artificial waxes, such as wool waxes, alkylolamine salts, quaternary ammonium compounds, clay, sulfonated tallow, sulfonated oils, alkyl sulfuric esters, and alkali metal caseinates.

The materials to be dispersed and the dispersing medium may be introduced into the heating zone in any suitable manner, and the proportions of the different components may be varied as desired. In carrying out the process of the invention, the materials to be dispersed and the dispersing medium are brought together in the desired proportion either by roughly mixing the materials in a single container, or by flowing the materials from separate containers into a mixing tube or chamber.

The dispersion system produced may vary widely in character depending largely upon the materials employed. Thus, they may consist of one or more different kinds of solid particles in a liquid suspending medium, both solid particles and liquid particles in a liquid dispersion medium, or one or more different kinds of liquid particles in a liquid dispersion medium. The dispersion medium may contain more than one component, as for example, solutions of glycerine and water (preferably 15–20% water) are very desirable dispersion media for sulfur.

Figure 2:
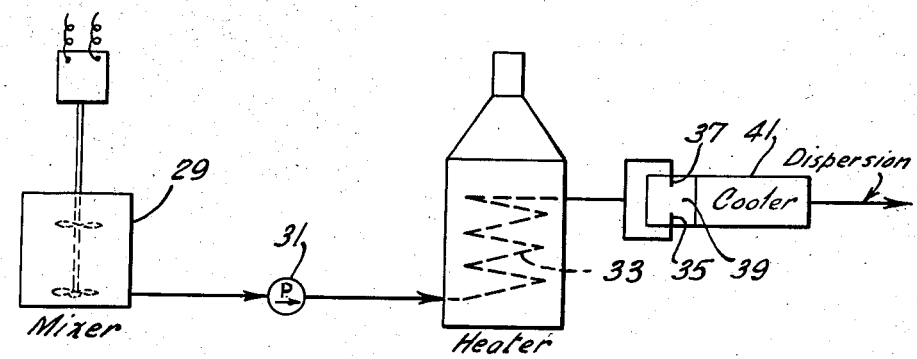

The invention will be described further in detail below with reference to the drawings, wherein:

Figs. 1 and 2 are schematic flow diagrams showing two alternative arrangements of apparatus for carrying out the invention.

Referring to Fig. 1, the invention will be exemplified as applied to the production of a dispersion of solid particles of sodium metal in a flowable dispersion medium which is inert to sodium and has a boiling point above the melting point of sodium, including among others the following:

Petroleum jelly
Sodium purified naphthalene
Tetralin
Dodecene
Deobase kerosene
Heptane
No. 332 White oil
Cetane
Nujol
Toluene
Dimethoxy decane
Fuel oil
Mineral oil
Xylene The principles of course, also apply to all alkali metals including sodium, lithium, potassium, cesium, rubidium, and alloys of one with the other.

A mass of sodium metal is melted in the tank 11 by circulating a hot hydrocarbon liquid in indirect heat exchange relationship therewith. Molten sodium is passed by a pump 13 to the interior of a heater 15 and into a long pipe coil 17. Simultaneously a liquid dispersion medium such as kerosene from a tank 19 is passed by a pump 21 into conjunction with the stream of molten sodium at the entrance to the coil 17. The kerosene should be above the melting point of sodium, 208.1° F., to prevent solidification. This can be assured by passing the kerosene through a pipe located within the heater 15 before it meets the sodium.

The two streams of liquid mix intimately together and flow through the coil 17 while the latter is heated in any suitable way. Preferably heating is accomplished by heat exchange with a hot liquid such as a high boiling eutectic mixture of diphenyl and diphenyl oxide sold under the trademark "Dowtherm" by the Dow Chemical Company (boiling point 258° C.), but heating also may be done by a gas or oil flame. The mixture is heated to a temperature high enough to vaporize all or a substantial portion of the kerosene while maintaining the sodium in a molten state. Consequently, the velocity and turbulence in the coil increase considerably as liquid vaporizes, the velocity being at least 25 feet per second, preferably above 100 feet per second, and often several thousand feet per second.

As a result of the high velocity and the agitation produced by the extremely turbulent flow developed in the pipe coil the liquid sodium is converted to tiny molten droplets which impinge against one another and against the walls of the tube until they are reduced to an extremely fine particle size such as 10 microns or less and predominantly less than 5 microns, a substantial proportion even being finer than one micron.

The mixture of liquid and vapor then leaves the pipe coil 17 and enters a cooler 23 wherein the vapor is condensed, the sodium particles are solidified, and a dispersion is formed of extremely fine solid particles of sodium suspended in kerosene. Cooling may be accomplished by flash cooling as the result of the reduced pressure, by circulating cool hydrocarbon liquid indirectly, or by injecting it directly into the effluent from the pipe coil 17. If desired, chamber 23 can be a classifier such as a cyclone separator to collect the liquid phase while removing vapors therefrom.

The resulting product can be used for performing various chemical reactions in a well known way, as for refining hydrocarbons, preparing alcohol-free alkoxides, or for halide condensation reactions.

Referring to Fig. 2, there is shown a modified system wherein the substance to be dispersed and the dispersing medium are mixed together in a mixer 29 and then passed simultaneously by a pump 31 into a pipe coil 33 which is heated to vaporize at least part of the liquid and form a rapidly flowing turbulent stream. In this modification dispersion is assured by splitting the effluent from coil 33 and passing the resulting two streams into a pair of diametrically opposed injector nozzles 35 and 37 which discharge high velocity jets against one another with great force within a chamber 39. As a result of impingement of the particles against one another they are further disintegrated to the extremely fine size desired in the ultimate products.

The downstream side of the chamber 39 constitutes a cooler 41 wherein the product is suddenly cooled by direct or indirect heat exchange with a fluid, after which the resulting dispersion is discharged either for storage or for direct consumption in a chemical process.

*Example I*

Using the apparatus shown in Fig. 1, a large pool of molten sodium is maintained at a temperature of 250° F. in the tank 11, and a pool of deobase kerosene at a temperature of 180° F. in the tank 19. To assist dispersion the kerosene contains 0.5% of linseed oil as a dispersing agent.

The sodium and kerosene are pumped at rates of 200 pounds per hour each into conjunction with one another at the entrance of heater coil 17 composed of ¼ inch iron pipe 200 feet long, the pressure being 200 pounds per square inch gauge (p. s. i. g.).

Before meeting the sodium stream, the kerosene stream is raised to a temperature of 220° F. in the heater 15.

The mixture passing through the pipe coil 17 is heated therein to a maximum temperature of 550° F. so that a substantial part of the kerosene is vaporized, while the remainder stays liquid to receive the fine particles of sodium generated in the process.

Upon discharge of the mixture into cooler 23 at atmospheric pressure it is cooled to 100° F. by indirect heat exchange with cool kerosene, and there is formed a dispersion of solid sodium particles in kerosene wherein the sodium particles will have a particle size distribution about as follows:

| Microns: | Percent of particles |
|---|---|
| Less than 1 | 41 |
| 1 to 5 | 50 |
| 5 to 10 | 9 |

*Example II*

A dispersion of sulfur in a water solution containing 12% ammonium caseinate is prepared by melting sulfur in tank 11 and passing the molten sulfur together with hot water solution from tank 19 in equal quantities at a rate of 300 pounds per hour each and a pressure of 250 p. s. i. g. into a pipe coil 17 as described above. The contents of the coil are heated to a maximum temperature of 410° F. so that about half of the water solution is vaporized and the liquid sulfur is converted by the turbulence and high velocity into tiny droplets which continually reenter the water phase and are dispersed therein. Upon entering cooler 23 at atmospheric pressure there is formed a stable suspension of sulfur particles in water solution.

*Example III*

Using the apparatus shown in Fig. 2 a slurry is made up in tank 29 of 50% solid paraffin wax particles in a water solution containing 12% of sodium caseinate as a dispersing agent. This slurry is passed at a rate of 400 pounds per hour and a pressure of 200 p. s. i. g. into a ¼ inch heater coil 33 250 feet long wherein the slurry is heated to 400° F., the wax melting and being converted by moderate turbulence and velocity into droplets flowing along with steam and water in the coil. The effluent from coil 33 enters the two nozzles 35 and 37 having ¼ inch orifices, and two jets are discharged against one another at an angle of 180° to cause further disintegration of the paraffin droplets to a size small enough to form a colloidal dispersion in water. Upon passing through cooler 41 the mixture is cooled by indirect heat exchange with water and a dispersion is formed of tiny solid paraffin particles in the water solution of sodium caseinate.

Obviously, many modifications and variations of the invention, as hereinbefore set forth, may be made without departing from the spirit and scope thereof, and therefore only such limitations should be imposed as are indicated in the appended claims.

I claim:

1. A method for producing a dispersion of a first normally solid substance in a liquid dispersion medium which is a non solvent therefor comprising simultaneously passing said first substance and said liquid together in a stream through a heating zone; heating said mixture sufficiently to melt said first substance and to vaporize at least a substantial part of said liquid to vapor, while maintaining said first substance in a liquid condition; subjecting said mixture and said vapor to high velocity of at least 25 feet per second and turbulent flow sufficient to break up said first substance to liquid particles of extremely fine size; and cooling said mixture and vapor, resolidify the particles of said first substance, to condense said vapor and form a dispersion of extremely fine particles of said first substance in said liquid dispersing medium.

2. A method in accordance with claim 1 wherein said mixture is heated sufficiently to vaporize only part of said mixture, and wherein at least part of said particles of extremely fine size reenter the unvaporized part of said mixture and are distributed therein prior to said cooling step.

3. A method in accordance with claim 1 wherein said first substance is alkali metal and said liquid dispersing medium is a hydrocarbon liquid which is inert to said alkali metal.

4. A method in accordance with claim 1 wherein said first substance is a hydrocarbon, and wherein said dispersing medium is a non-solvent for said hydrocarbon.

5. A method in accordance with claim 1 wherein said first substance is sulfur and said dispersing medium is a non-solvent for sulfur.

6. A method in accordance with claim 1 wherein said cooling step is performed by circulating a cooling fluid in indirect heat exchange relationship with said mixture and vapor.

7. A method in accordance with claim 1 wherein said cooling step is performed by introducing additional dispersing medium into said mixture and vapor.

8. A method in accordance with claim 1 wherein said heating zone is an elongated heated tubular zone, and wherein said mixture and said vapor are subjected to high velocity and turbulent flow during passage thereof through said tubular zone.

9. A method in accordance with claim 1 wherein said mixture and vapor are at least partly subjected to high velocity and turbulent flow by discharging at least two jets thereof against one another at high velocity.

10. A method in accordance with claim 1 wherein said mixture is first formed upstream of said heating zone and is then passed into said heating zone.

11. A method in accordance with claim 1 wherein said mixture is formed by passing separate streams of said substance and said dispersing medium into said heating zone.

12. A method in accordance with claim 11, also comprising melting said substance, and passing said substance as a molten stream into association with said dispersing medium.

13. A method in accordance with claim 1 wherein said mixture is heated sufficiently to vaporize substantially all of said liquid to vapor.

References Cited in the file of this patent
UNITED STATES PATENTS 2,021,143     Calcott et al. _____ Nov. 19, 1935

UNITED STATES PATENT OFFICE

CERTIFICATE OF CORRECTION

Patent No. 2,844,541　　　　　　　　　　　　　　　　July 22, 1958

Lincoln Thomas Work

It is hereby certified that error appears in the printed specification of the above numbered patent requiring correction and that the said Letters Patent should read as corrected below.

Column 5, lines 18 and 19, strike out "to condense said vapor" and insert the same after "vapor" and before the comma in line 17, same column.

Signed and sealed this 2nd day of December 1958.

(SEAL)
Attest:

KARL H. AXLINE
Attesting Officer

ROBERT C. WATSON
Commissioner of Patents